(No Model.)
E. C. MYRICK & G. C. DOEG.
HAND HOLE PLATE FOR STEAM BOILERS.
No. 551,596. Patented Dec. 17, 1895.
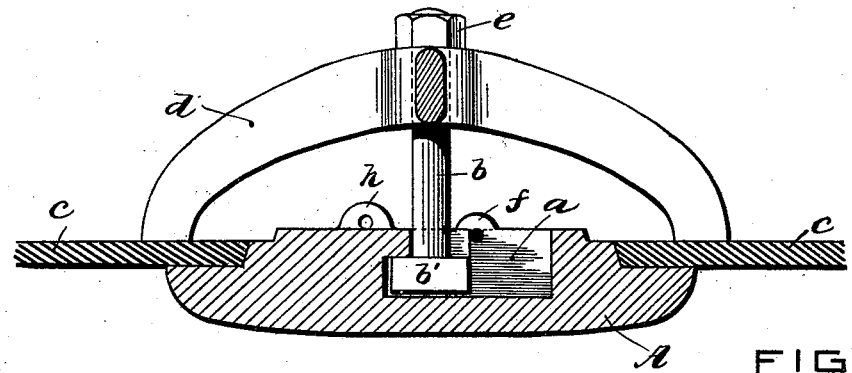
FIG. 1.
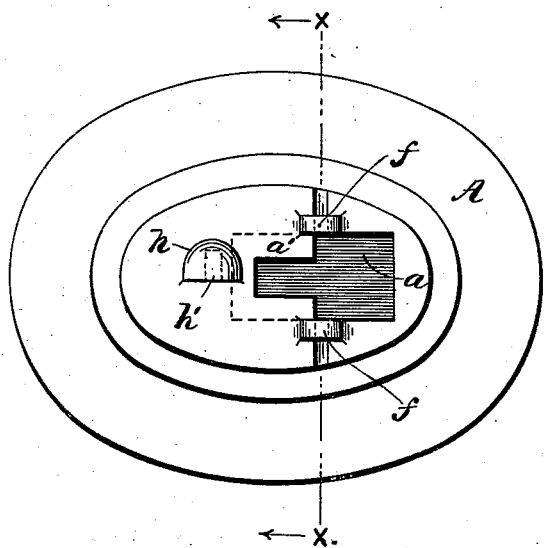
FIG. 2.
FIG. 4.
FIG. 3.
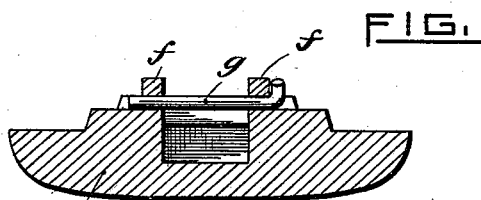
WITNESSES. INVENTORS

UNITED STATES PATENT OFFICE.

EUGENE C. MYRICK AND GEORGE C. DOEG, OF PROVIDENCE, RHODE ISLAND.

HAND-HOLE PLATE FOR STEAM-BOILERS.

SPECIFICATION forming part of Letters Patent No. 551,596, dated December 17, 1895.

Application filed June 26, 1895. Serial No. 554,095. (No model.)

*To all whom it may concern:*

Be it known that we, EUGENE C. MYRICK and GEORGE C. DOEG, both of the city and county of Providence, in the State of Rhode Island, have invented certain new and useful Improvements in Hand-Hole Plates for Steam-Boilers; and we do hereby declare the following specification, taken in connection with the accompanying drawings, forming a part of the same, to be a full, clear, and exact description thereof.

As heretofore constructed, the plate most commonly used for closing a hand-hole in a steam-boiler has been provided with a projecting stud rigidly secured thereto. This stud is provided with a flange or collar near one end of the stud, and is secured to the plate by inserting the end extending beyond said collar through a hole formed in the plate and then hammering over the end of the stud to form a rivet-head, the plate being thereby held between the collar and the rivet-head. As the hole in the plate for receiving the end of the stud extends through the plate, it is necessary to make a steam-tight joint between the plate and the attached stud, and to this end the face of the plate is provided with a counterbore, into which the collar on the stud is fitted.

When in place the stud is necessarily subjested to extreme heat, with the result that the metal composing the same very soon becomes crystallized and rendered brittle and unable to resist much torsional strain. On the other hand, the nut is very liable to become so set upon the screw-threaded end of the stud that a great amount of force is required to start it. As a result, when an attempt is made to remove the nut, by means of which, in connection with a suitable frame or frog, the plate is held in place to permit a removal of the plate or when it is attempted to set up the nut—as, for instance, in the case of a leak about the plate—it very frequently happens that the stud breaks or twists off. The breaking of the stud, even at a time when the contents of the boiler are drawn off for the purpose of cleaning or inspection, is a troublesome matter by reason of the time and labor required to replace the broken stud with a new one. Thus as the broken stud was riveted to the plate it becomes necessary in the first place to chip off the rivet-head so that the end of the broken stud can be removed, then the end of the stud has to be driven out, then the hole through the plate has to be bored out and counterbored to true it so that the end of the new stud and its collar will properly fit the same, then the stud and the collar thereon have to be turned so that they will fit the hole and counterbore in the plate properly and snugly so as to make a steam-tight joint and prevent leakage, and then finally the new stud has to be driven in and its end hammered over to form the necessary rivet-head thereon.

When the stud breaks as a result of an attempt to set up the nut with the boiler under steam-pressure for the purpose of stopping a leak, in addition to the difficulties above referred to, a very serious and dangerous situation is presented, for the breaking of the stud destroys the means of holding the plate in place, and the liability of the attendant being seriously scalded by escaping steam and water is very great.

To overcome the various objections and difficulties attending the employment of the aforesaid construction embodying a riveted stud is the object of the present invention.

To that end the invention consists in the construction hereinafter described, and particularly pointed out in the claims.

Referring to the drawings, Figure 1 is a sectional view of a hand-hole plate embodying our invention, held in place to close a hole or opening in the wall of a boiler. Fig. 2 is a plan view of the plate. Fig. 3 is a transverse section on the line *x x* of Fig. 2, and Fig. 4 represents a hook adapted for a purpose hereinafter described.

The plate A, which is of the usual oval or elliptical form, is provided with a mortise *a*, a portion of which is undercut so as to form a projecting flange *a'*, as shown in the drawings. *b* is an ordinary headed bolt provided with a flanged head *b'*, preferably square. The mortise *a* is of sufficient width to permit the head *b'* of the bolt *b* to be inserted therein, and is about twice as long as it is wide. With this construction all that is required to connect the holding-bolt with the plate is simply to insert the head of the bolt into the open end of the mortise $a$ and then move the bolt sidewise so that the flanged head of the bolt will pass under the overhanging flange $a'$. The bolt will then be held against any lengthwise pull, and consequently when the plate A is placed in position to close an opening in the wall $c$ of a boiler said bolt will serve, in connection with the usual frame or frog $d$ and nut $e$, to hold the plate in place. If now the bolt at any time becomes broken as the result of an attempt to remove the nut to permit the removal of the plate, all that is required in order to replace the broken bolt and adapt the plate to be again held in position is simply to slide the end of the broken bolt sidewise to disengage the head of the bolt from the flange $a'$ and then insert a new bolt in the same manner as before. As will be obvious, this can be quickly and easily done.

To guard against the bolt accidentally working sidewise a sufficient distance to permit the disengagement of the head of the bolt from the flange $a'$, the plate A is provided with lugs or ears $f$, through which is passed a pin $g$, as shown in Fig. 3.

It may sometimes become necessary or desirable to substitute a new bolt without removing the plate from the boiler, and without drawing off the contents of the boiler—as, for instance, when a leak is discovered around the plate and when in setting up the nut in an endeavor to stop such leak the bolt breaks or twists off. To permit or facilitate the removal of the broken bolt and the substitution of a new one without removing the plate from the boiler, the plate may be provided with another lug or ear $h$ having a hole or opening $h'$ adapted to receive the bent end of a suitable hook or holding device, as $i$, Fig. 4. With this construction the plate may be held in place temporarily by means of the hook $i$, and independent of the bolt $b$, and consequently said plate may be thus held in place while the end of the old bolt is removed therefrom, and a new bolt substituted and the nut set up thereon. If necessary this may be done by a single workman, who can hold the plate in place with one hand and make the change of bolts with the other. Furthermore such change may be safely made, if necessary, without drawing off the contents of the boiler, and even when the boiler is under steam-pressure. The matter of being thus able to replace a broken bolt with a new one without removing the plate from the boiler, and even when the boiler is under steam-pressure, is very important, as thereby what might otherwise be serious accidents may be prevented.

It sometimes happens that the holding stud or bolt has not been sufficiently effected by the heat to break readily, and that at the same time the nut has become so set that it is very difficult, if not impossible, to start it.

With the present construction it will be seen that whenever such a condition arises the frog and bolt may together be driven sidewise and so as to disengage the head of the bolt from the flange $a'$, and thus permit the removal of the parts. This also is a material advantage, as will be readily understood.

The invention hereinbefore described may of course be employed with the manhole-plates as well as with those for the hand-holes, and where the plate is of such size as to require two holding-bolts, they may each be connected with the plate in the manner above set forth.

What we claim as our invention, and desire to secure by Letters Patent, is—

1. A hand hole plate provided with a mortise $a$, overhanging flanges $a'$, and perforated ears $f$ substantially as described.

2. A hand hole plate provided with a mortise $a$ overhanging flange $a'$, perforated ears $f$ and lug $h$ substantially as described.

3. The combination with a hand hole plate provided with a mortise having overhanging flanges of perforated lugs adjacent to the ends of said flanges, a bolt having a head engaging said flanges, and a pin passing through said lugs, substantially as described.

EUGENE C. MYRICK.
GEORGE C. DOEG.

Witnesses:
W. H. THURSTON,
S. J. MURPHY.